United States Patent
Inha et al.

(10) Patent No.: US 9,622,063 B2
(45) Date of Patent: Apr. 11, 2017

(54) METHOD AND APPARATUS FOR AUTOMATED DEVICE SUBSCRIPTION MONITORING

(75) Inventors: Kai Allan Inha, Jarvenpaa (FI); Torben Brodsgaard, Beijing (CN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/407,673

(22) PCT Filed: Jun. 21, 2012

(86) PCT No.: PCT/CN2012/077311
§ 371 (c)(1),
(2), (4) Date: Dec. 12, 2014

(87) PCT Pub. No.: WO2013/189061
PCT Pub. Date: Dec. 27, 2013

(65) Prior Publication Data
US 2015/0195698 A1    Jul. 9, 2015

(51) Int. Cl.
| | | |
|---|---|---|
| *H04W 4/26* | (2009.01) | |
| *H04W 8/18* | (2009.01) | |
| *H04W 4/00* | (2009.01) | |
| *H04M 15/00* | (2006.01) | |

(52) U.S. Cl.
CPC .......... *H04W 4/26* (2013.01); *H04M 15/846* (2013.01); *H04M 15/852* (2013.01); *H04W 4/001* (2013.01); *H04W 8/18* (2013.01)

(58) Field of Classification Search
CPC ........... H04W 4/26; H04W 4/24; H04W 4/20; H04M 15/00; H04M 15/84; H04M 15/842; H04M 15/844; H04M 15/846; H04M 15/85; H04M 15/851; H04M 15/852; H04M 15/853; H04M 15/854

USPC .......... 455/404.2, 405, 416, 407, 408, 410, 455/412.2, 414.3, 414.4, 428, 435.2

See application file for complete search history.

(56) References Cited

U.S. PATENT DOCUMENTS

| | | | | |
|---|---|---|---|---|
| 7,986,935 B1* | 7/2011 | D'Souza | ................ | G06Q 30/02 379/114.02 |
| 2007/0270135 A1* | 11/2007 | Gaschler | ............... | H04W 48/18 455/414.3 |
| 2009/0298463 A1 | 12/2009 | Zhang | | |

(Continued)

FOREIGN PATENT DOCUMENTS

CN    102413547 A    4/2012

OTHER PUBLICATIONS

International Search Report and Written Opinion received for corresponding Patent Cooperation Treaty Application No. PCT/CN2012/077311, dated Mar. 28, 2013, 11 pages.

Primary Examiner — Siu Lee
(74) Attorney, Agent, or Firm — Ditthavong & Steiner, P.C.

(57) ABSTRACT

An approach is provided for optimizing the use of a device based on the subscriptions and contextual information associated with the device. The optimizing platform determines at least one request to perform one or more activities associated with at least one device. The optimizing platform processes and/or facilitates a processing of the at least one request against one or more conditions of one or more subscriptions associated with the at least one device to cause, at least in part, a recommendation of at least one of the one or more subscriptions for performing the one or more activities.

20 Claims, 9 Drawing Sheets

(56) References Cited

U.S. PATENT DOCUMENTS

2012/0078829 A1\* 3/2012 Bodor ................... G06Q 30/02
　　　　　　　　　　　　　　　　　　　　　　706/45
2012/0329424 A1\* 12/2012 Gudlavenkatasiva
　　　　　　　　　　　　　.......................... H04L 12/1421
　　　　　　　　　　　　　　　　　　　　　　455/406

\* cited by examiner

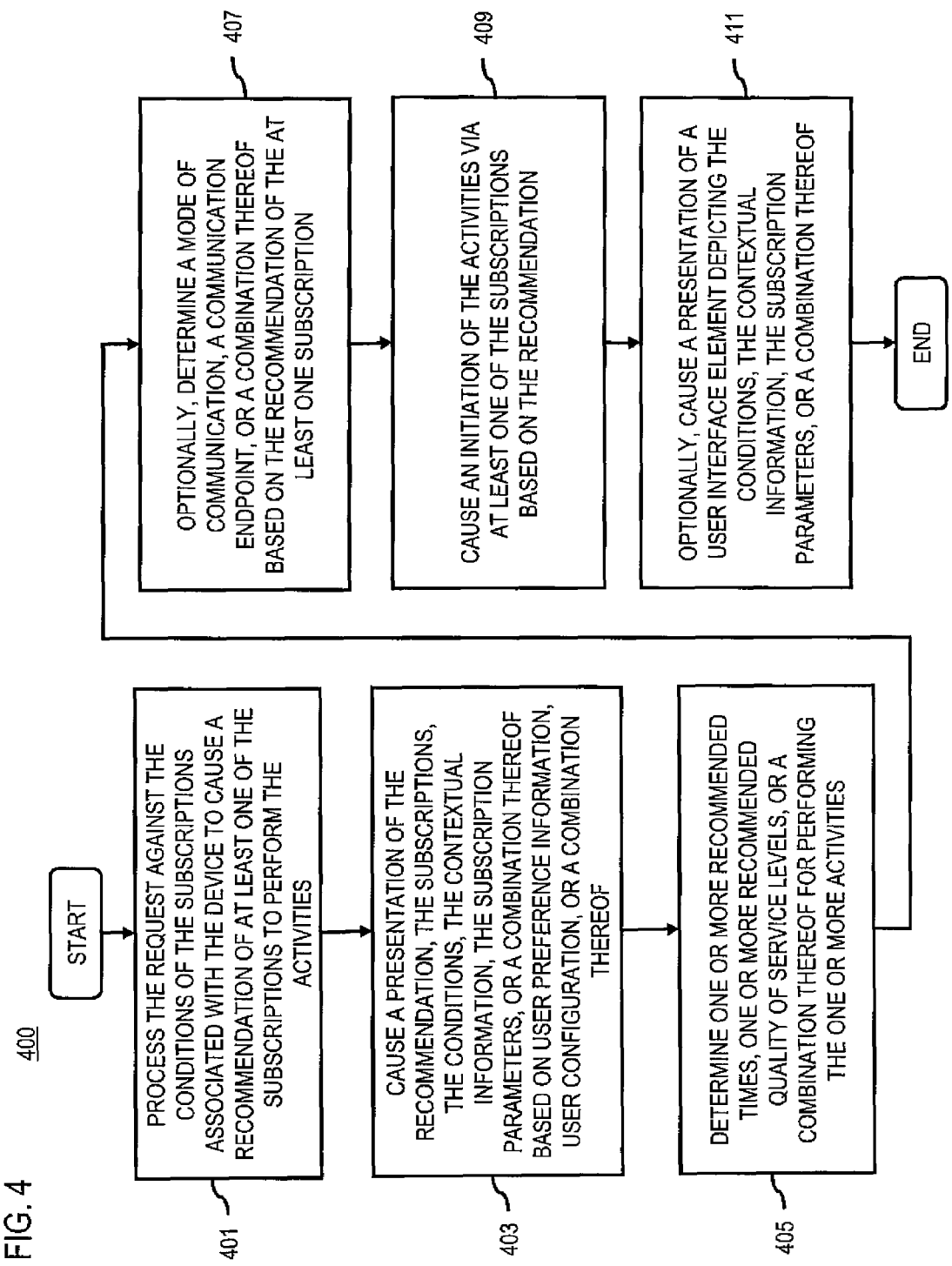

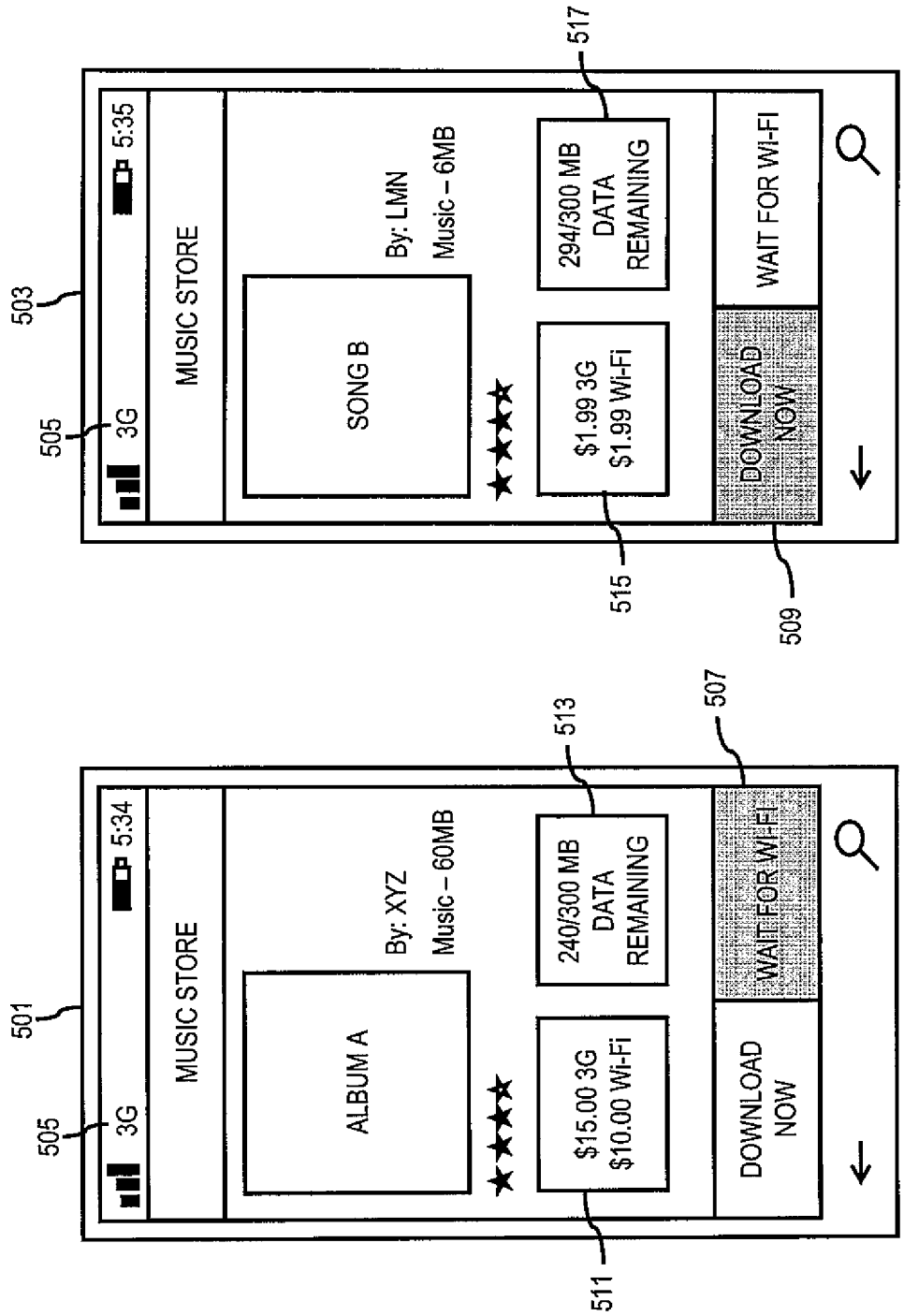

METHOD AND APPARATUS FOR
AUTOMATED DEVICE SUBSCRIPTION
MONITORING

RELATED APPLICATION

This application was originally filed as Patent Cooperation Treaty Application No. PCT/CN2012/077311 filed Jun. 21, 2012.

BACKGROUND

Service providers and device manufacturers (e.g., wireless, cellular, etc.) are continually challenged to deliver value and convenience to consumers by, for example, providing compelling network services. One are of interest has been the development of subscription services that afford users of mobile devices (e.g., mobile phones and/or tablets) a wide range of capabilities such as making and receiving telephone and/or video calls, sending and receiving text messages (e.g., via short message service (SMS), multimedia messaging service (MMS), etc.), browsing the Internet, transmitting or receiving data (e.g., mapping and/or navigation information, media, social networking updates, etc.), etc. However, modem subscriptions come with a variety of different conditions and costs associated with those conditions. As a consequence, it is almost impossible for a normal user to keep track of all the conditions and associated costs. Although some service providers have previously offered services that alert a user that his or her use of one or more subscriptions has exceeded a certain limit, in most cases, these alerts or notifications are provided after the fact and do not address all of the alternating portions of the user's subscriptions and/or usage. Accordingly, service providers and device manufacturers face significant technical challenges in providing a service that automatically monitors the subscriptions and usage of a device to optimize its use in a cost effective manner.

SOME EXAMPLE EMBODIMENTS

Therefore, there is a need for an approach for optimizing the use of a device based on the subscriptions and contextual information associated with the device.

According to one embodiment, a method comprises determining at least one request to perform one or more activities associated with at least one device. The method also comprises processing and/or facilitating a processing of the at least one request against one or more conditions of one or more subscriptions associated with the at least one device to cause, at least in part, a recommendation of at least one of the one or more subscriptions for performing the one or more activities.

According to another embodiment, an apparatus comprises at least one processor, and at least one memory including computer program code for one or more computer programs, the at least one memory and the computer program code configured to, with the at least one processor, cause, at least in part, the apparatus to determine at least one request to perform one or more activities associated with at least one device. The apparatus is also caused to process and/or facilitate a processing of the at least one request against one or more conditions of one or more subscriptions associated with the at least one device to cause, at least in part, a recommendation of at least one of the one or more subscriptions for performing the one or more activities.

According to another embodiment, a computer-readable storage medium carries one or more sequences of one or more instructions which, when executed by one or more processors, cause, at least in part, an apparatus to determine at least one request to perform one or more activities associated with at least one device. The apparatus is also caused to process and/or facilitate a processing of the at least one request against one or more conditions of one or more subscriptions associated with the at least one device to cause, at least in part, a recommendation of at least one of the one or more subscriptions for performing the one or more activities. According to another embodiment, an apparatus comprises means for determining at least one request to perform one or more activities associated with at least one device. The apparatus also comprises means for processing and/or facilitating a processing of the at least one request against one or more conditions of one or more subscriptions associated with the at least one device to cause, at least in part, a recommendation of at least one of the one or more subscriptions for performing the one or more activities.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-20 and 36-38.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 3 and 4 are flowcharts of processes for optimizing the use of a device based on the subscriptions and contextual information associated with the device, according to one embodiment;

FIGS. 5A and 5B are diagrams of user interfaces utilized in the processes of FIGS. 3 and 4, according to various embodiments;

DESCRIPTION OF SOME EMBODIMENTS

Examples of a method, apparatus, and computer program for optimizing the use of a device based on the subscriptions and contextual information associated with the device are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
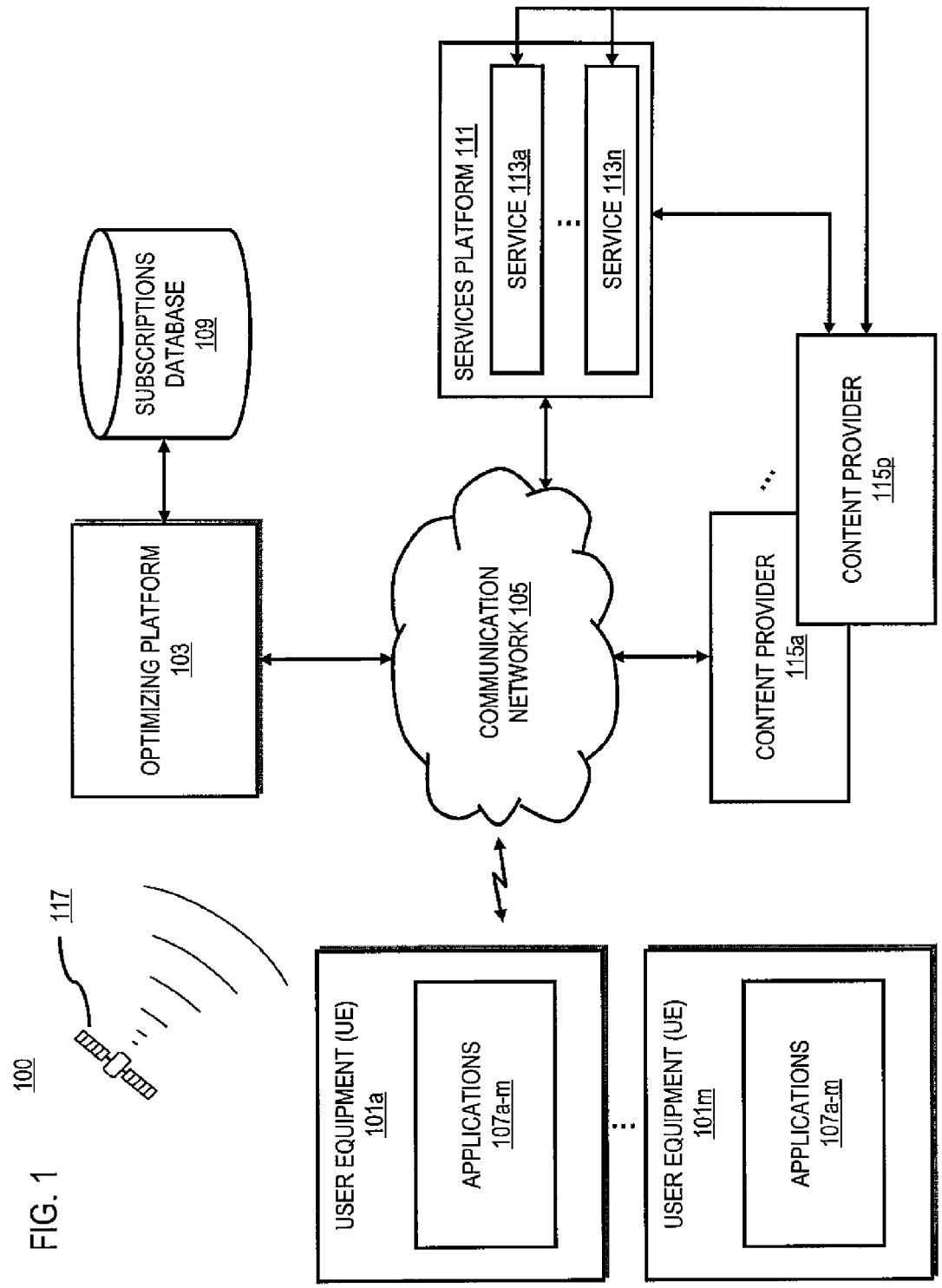
FIG. 1 is a diagram of a system capable of optimizing the use of a device based on the subscriptions and contextual information associated with the device, according to one embodiment.

FIG. 1 is a diagram of a system capable of optimizing the use of a device based on the subscriptions and contextual information associated with the device, according to one embodiment. As previously discussed, one area of interest among service providers and device manufacturers has been the development of subscriptions that afford users of mobile devices (e.g., mobile phones and/or tablets) a wide range of capabilities such as making and receiving telephone and/or video calls, sending and receiving text messages (e.g., via SMS, MMS, etc.), browsing the Internet, transmitting and receiving data (e.g., mapping and/or navigation information, media, social networking updates, etc.), etc. However, modern subscriptions come with a variety of different conditions and costs associated with those conditions. More specifically, calls can be free at certain times of the day (e.g., after 7 p.m.) or during weekends. The cost of a call can also vary based on the numbers dialed (e.g., a fixed line number, a mobile number, the same or a different carrier, etc.). The transmission or reception of data can be free up to a certain amount per timeslot. Text messaging (e.g., SMS and MMS) can also be free up to a certain amount per agreed period. Further, roaming charges may vary a lot based on subscription conditions. As a result, it is almost impossible for a normal user to keep track of all the conditions and associated costs.

To address this problem, a system 100 of FIG. 1 introduces the capability to optimize the use of a device based on its subscriptions and context. In one embodiment, the system 100 first determines at least one request to perform one or more activities associated with at least one device (e.g., a mobile phone or a tablet). By way of example, the one or more activities may include making and receiving telephone and/or video calls, sending and receiving text messages (e.g., via SMS, MMS, etc.), browsing the Internet, transmitting and receiving data (e.g., mapping and/or navigation information, media, social networking updates, etc.), etc.

In one or more embodiments, the system 100 next determines an input for specifying one or more subscriptions, one or more conditions, contextual information, one or more subscription parameters, or a combination thereof associated with the at least one device. By way of example, the system 100 can determine the subscription information (e.g., the one or more conditions) from a user entry, metadata associated with the one or more subscriptions, a cloud resource, the service provider, or a combination thereof. In particular, in one embodiment, the one or more subscriptions are associated with one or more communication carriers. Moreover, the one or more conditions may include, at least in part, the when, where, and under what conditions (i.e., the rules or logic) by which the one or more activities associated with the at least one device will incur a cost and/or consume minutes, text, and/or data associated with the one or more subscriptions. More specifically, the one or more conditions may also indicate the amount of minutes, text, and/or data available at one rate (e.g., a daytime rate) and the amount of minutes, text, and/or data available at another rate (e.g., a nighttime and/or weekend rate). In addition, the one or more subscription parameters or details may include, at least in part, the amount of minutes, text, and/or data remaining during a particular term of the one or more subscriptions (e.g., the amount of minutes remaining for that month). Further, it is contemplated that in the example use case of one or more subscriber identity module (SIM) cards used with the at least one device (e.g., multiple SIM cards associated with one or more service subscriptions, one or more communication carriers, or a combination thereof), the system 100 could also determine the one or more subscriptions, for example, associated with the one or more SIM cards in the same manner as the system 100 determines the one or more subscriptions associated with the at least one device.

In one embodiment, the system 100 then determines contextual information associated with the at least one device, wherein a recommendation of at least one of the one or more subscriptions is based, at least in part, on the contextual information. For example, the system 100 can determine a time (e.g., a.m. or p.m., weekday or weekend, etc.), a location (e.g., a home location, a roaming status, etc.), carrier alternatives, a potential communication endpoint (e.g., a fixed line number or a mobile number), etc.

associated with the one or more activities, the at least one device, or a combination thereof. In certain embodiments, the system 100 next determines account status information associated with the one or more subscriptions, wherein the recommendation of the at least one of the one or more subscriptions is based, at least in part, on the account status information. By way of example, the account status may include information as to whether a particular subscription is on hold or is in a suspended state, which may allow certain activities (e.g., home location calls) to proceed, but prohibit other terminal capabilities until the status of the account has been resolved. In addition, the account status information may also include the one or more types of subscriptions associated with the at least one device (e.g., individual, prepaid, data only, etc.).

In one or more embodiments, once the system 100 determines the subscription details and conditions and the contextual information of the at least one device, the system 100 processes and/or facilitates a processing of the at least one request (e.g., to make a telephone call) against the one or more conditions of the one or more subscriptions associated with the at least one device (e.g., free calls after 7 p.m.) to cause, at least in part, a recommendation of at least one of the one or more subscriptions for performing the one or more activities. More specifically, the system 100 may inform the user of the best time for performing the one or more activities or alert the user of a non-optimal use of the one or more subscriptions (e.g., attempting to download an entire music album before 7 p.m.). Further, it is contemplated that in certain embodiments, the system 100 may cause, at least in part, one or more automated functions (e.g., delaying the transmission of one or more text messages until a cost optimized timeslot becomes available).

In one embodiment, the system 100 next causes, at least in part, a presentation of the recommendation of the at least one or more subscriptions, the one or more conditions, the contextual information, the one or more subscription parameters, or a combination thereof based, at least in part, on user preference information, user configuration information (e.g., a user input), or a combination thereof. By way of example, the system 100 may alert the user to "send free MMS now, you have 121 MMS left for free to send at this hour" or "your roaming data is free now, this is a good time to load your maps." It is contemplated that the frequency by which the system 100 notifies a user of the recommendation would be based on one or more standard settings that the user could easily modify to fit his or her lifestyle. For example, in the beginning of the month, when the user has the most minutes, text, and/or data available, the user may want the system 100 to generate recommendations less frequently than at the end of the month when the user presumably has the least amount of minutes, text, and/or data available. In addition, the user may want to control the type of notifications caused by the system 100 based on his or her general use of the device. For example, if the user mainly carries the at least one device (e.g., a mobile phone) in his or her pocket, then the user can set the system 100 to vibrate the device when the system 100 generates a cost and/or data saving recommendation. In contrast, if the user mainly carries his or her device in a bag or pocketbook, then the user can set the system 100 to audibly notify the user through the device when the system 100 generates a cost and/or data saving recommendation.

In one embodiment, the system 100 may also determine one or more recommended times, one or more recommended quality of service levels, or a combination thereof for performing the one or more activities based, at least in part, on the one or more conditions, the contextual information, the one or more subscription parameters, or a combination thereof. By way of example, a user riding a bus or train home from work may be browsing one or more applications at an Internet application store (e.g., Nokia Store) or one or more cooking recipes on a cooking website. If the user attempts to download an application or a recipe while on the bus or train, the system 100 may inform the user that he or she could save cost and/or time by downloading the one or more applications or the one or more recipes when the user gets home and is able to connect to a wireless fidelity (Wi-Fi) network. In addition, the system 100 may determine that at a particular time of day (e.g., 6 p.m.), one or more networks are congested and therefore the system 100 may recommend that the user perform the one or more activities (e.g., downloading a music album) at a later time to save cost and/or time.

In certain embodiments, wherein the one or more activities include, at least in part, an establishment of at least one communication session (e.g. a telephone call) with one or more other devices (e.g., a mobile phone), the system 100 can determine a mode of communication, a communication endpoint, or a combination thereof based, at least in part, on the recommendation of the at least one of the one or more subscriptions. By way of example, at the time of making a telephone call, the system 100 may notify the user "you could make a free call to this person, if you try his fixed line first." In one embodiment, the system 100 then causes, at least in part, an initiation of the one or more activities via the at least one of the one or more subscriptions based, at least in part, on the recommendation. In particular, in the previous example use case, the system 100 could ask the user "whether the system 100 should dial the fixed line number now?"

In one or more embodiments, the system 100 may cause, at least in part, a presentation of at least one user interface element depicting the one or more conditions, the contextual information, the one or more subscription parameters, or a combination thereof. More specifically, it is contemplated that the presentation of this information on the at least one device (e.g., a mobile phone) can enable the user to keep track and/or understand all of the conditions and usage associated with his or her devices. In one example use case, the system 100 may present the at least one user interface element as one or more live or dynamic tiles running in the background of the home screen of the at least one device. In particular, the one or more live times may inform the user, for example, of the cost and/or the amount of data a particular activity will incur and/or consume at a given time and location. In another example use case, the system 100 may present the at least one user interface element as one or more icons on top of a device (e.g., a mobile phone) to inform the user in substantially real-time of the number of minutes, texts, and/or data remaining for the subscription period.

As shown in FIG. 1, the system 100 comprises one or more user equipment (UE) 101*a*-101*m* (e.g., a mobile phone or a tablet) (also collectively referred to as UEs 101) having connectivity to an optimizing platform 103 via a communication network 105. The UEs 101 may include or have access to one or more applications 107*a*-107*m* (e.g., an Internet browser, communication applications, mapping and/or navigation applications, media applications, social networking applications, etc.) (also collectively referred to as applications 107).

In one embodiment, the optimizing platform 103 may include or be associated with at least one subscriptions database 109. The optimizing platform 103 may exist in whole or in part within a UE 101, or independently and the subscriptions database 109 may exist in whole or in part within the optimizing platform 103. The subscriptions database 109 may include one or more subscriptions (e.g., service contracts with a communication carrier), one or more conditions (e.g., rules), and/or one or more subscription parameters (e.g., details) associated with the at least one device (e.g., a mobile phone), one or more SIM cards, or a combination thereof. In addition, the subscriptions database 109 may also include account status information and/or user preference information, user configuration information, or a combination thereof associated with the at least one device, the one or more SIM cards, or a combination thereof.

The UEs 101 are also connected to a services platform 111 via the communication network 105. The services platform 111 includes one or more services 113*a*-113*n* (also collectively referred to as services 113). The services 113 may include a wide variety of services such as content provisioning services for the one or more applications 107 (e.g., communication services, location-based services, Internet media streaming services, social networking services, etc.). In addition, the UEs 101, the optimizing platform 103, the applications 107, the services platform 111, and the services 113 are also connected to one or more content providers 115*a*-115*p* (also collectively referred to as content providers 115) via the communication network 105. The content providers 115 also may provision a wide variety of content (e.g., one or more maps) to the components of the system 100.

In one embodiment, the optimizing platform 103 may utilize location-based technologies (e.g., global positioning system (GPS), cellular triangulation, Assisted GPS (A-GPS), etc.) to determine contextual information associated with the UEs 101. In addition, one or more applications 107 may also use the location-based technologies to make a request to one or more services 113 and/or one or more content providers 115 for location-based data (e.g., mapping and/or navigation information) based on a position relative to a UE 101. For example, a UE 101 may include a GPS receiver to obtain geographic coordinates from the satellites 117 to determine its current position.

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

The UEs 101 are any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UEs 101 can support any type of interface to the user (such as "wearable" circuitry, etc.).

In one embodiment, the optimizing platform 103 first determines at least one request to perform one or more activities associated with at least one device (e.g. a mobile phone or a tablet). As previously discussed, the one or more activities may include making and receiving telephone and/or video calls, sending and receiving text messages (e.g., via SMS, MMS, etc.), browsing the Internet, transmitting and receiving data (e.g., mapping and/or navigation information, media, social networking updates, etc.), etc. In one or more embodiments, the optimizing platform 103 next determines an input for specifying the one or more subscriptions, the one or more conditions, the contextual information, the one or more subscription parameters, or a combination thereof associated with the at least one device. In particular, the optimizing platform 103 can determine the subscription information (e.g., the one or more conditions) from a user entry, metadata associated with the one or more subscriptions, a cloud resource, the service provider, or a combination thereof. As previously discussed, the one or more conditions include, at least in part, the when, where, and under what conditions (i.e., the rules) the one or more activities associated with the at least one device (e.g., a mobile phone) will incur a cost and/or consume minutes, text, and/or data associated with the one or more subscriptions. More specifically, the one or more conditions may indicate the amount of minutes, text, and/or data available at one rate (e.g., a daytime rate) and the amount of minutes, text, and/or data available at another rate (e.g., a nighttime and/or weekend rate). In addition, the one or more subscription parameters or details may include, at least in part, the amount of minutes, text, and/or data remaining during a particular term of the one or more subscriptions (e.g., the amount of minutes remaining for that month).

In one or more embodiments, the optimizing platform 103 then determines contextual information associated with the at least one device, wherein a recommendation of at least one of the one or more subscriptions (e.g., making a call) is based, at least in part, on the contextual information. By way of example, the optimizing platform 103 can determine a time (e.g., a.m. or p.m., weekday or weekend, etc.), a location (e.g., a home location, a roaming status, etc.), carrier alternatives, a potential communication endpoint (e.g., a fixed line number or a mobile number), etc. associated with the one or more activities. In certain embodiment, the optimizing platform 103 next determines account status information associated with the one or more subscriptions, wherein the recommendation of the at least one of the one or more subscriptions is based, at least in part, on the account status information.

In one embodiment, once the optimizing platform 103 determines the subscription details and conditions and the contextual information of the at least one device, the optimizing platform 103 processes and/or facilitates a processing of the at least one request (e.g., to make a telephone call) against the one or more conditions of the one or more subscriptions associated with the at least one device (e.g., free calls after 7 p.m.) to cause, at least in part, a recommendation of at least one of the one or more subscriptions for performing the one or more activities. More specifically, the optimizing platform 103 may inform the user of the best time for performing the one or more activities or alert the user of a non-optimal use of the one or more subscriptions (e.g., downloading a music album before 7 p.m.). In addition, it is contemplated that in certain embodiments, the optimizing platform 103 may cause, at least in part, one or more automated functions (e.g., delaying the transmission of one or more text messages until a cost optimized timeslot becomes available).

In one or more embodiments, the optimizing platform 103 next causes, at least in part, a presentation of the recommendation of the at least one or more subscriptions, the one or more conditions, the contextual information, the one or more subscription parameters, or a combination thereof based, at least in part, on user preference information, user configuration information, or a combination thereof. As previously discussed, the optimizing platform 103 may alert the user to "send free MMS now, you have 121 MMS left for free to send at this hour" or "your roaming data is free now, this is a good time to load your maps." It is contemplated that the frequency by which the optimizing platform 103 notifies or alerts the user of the recommendations would be based on one or more standard settings that the user can easily modify to fit his or her lifestyle. By way of example, in the beginning of the month, when the user has the most minutes, text, and/or data available, the user may want the optimizing platform 103 to generate recommendations less frequently than at the end of the month when the user presumably has the least amount of minutes, text, and/or data available.

In one embodiment, the optimizing platform 103 may also determine one or more recommended times, one or more recommended quality of service levels, or a combination thereof for performing the one or more activities based, at least in part, on the one or more conditions, the contextual information, the one or more subscriptions, or a combination thereof. As previously discussed, a user riding a bus or train home from work may be browsing one or more applications at an Internet application store (e.g., Nokia Store) or one or more cooking recipes on a cooking website. If the user attempts to download an application or a recipe while on the bus or the train, the optimizing platform 103 may inform the user that he or she could save cost and/or time by downloading the application or the recipe when the user gets home and is able to connect to a Wi-Fi network.

In certain embodiments, wherein the one or more activities include, at least in part, an establishment of at least one communication session (e.g., a telephone call) with one or more other devices (e.g., a mobile phone), the optimizing platform 103 can determine a mode of communication, a communication endpoint, or a combination thereof based, at least in part, on the recommendation of the at least one of the one or more subscriptions. For example, at the time of making a call, the optimizing platform 103 may notify the user "you could make a free call to this person, if you try his fixed line first." In one embodiment, the optimizing platform 103 then causes, at least in part, an initiation of the one or more activities via the at least one of the one or more subscriptions based, at least in part, on the recommendation. In particular, in the previous example use case, the optimizing platform 103 could ask the user "whether the optimizing platform 103 should dial the fixed line number now?"

In one or more embodiments, the optimizing platform 103 may cause, at least in part, a presentation of at least one user interface element depicting the one or more conditions, the contextual information, the one or more subscription parameters, or a combination thereof. More specifically, it is contemplated that the presentation of this information on the at least one device (e.g., a mobile phone or a tablet) by the optimizing platform 103 can enable the user to keep track and/or understand all of the conditions and usage associated with his or her devices. By way of example, the optimizing platform 103 may present the at least one user interface element as one or more live or dynamic tiles running in the background of the home screen of the at least one device. In particular, the one or more lives tiles may inform the user, for example, of the cost and/or the amount of data a particular activity will incur and/or consume at a given time and location. In another example use case, the optimizing platform may present the at least one user interface element as one or more icons on top of a device (e.g., a mobile phone) to inform the user in substantially real-time of the number of minutes, texts, and/or data remaining for the subscription period.

By way of example, the UEs 101, the optimizing platform 103, the services platform 111, the content providers 115, and the satellites 117 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
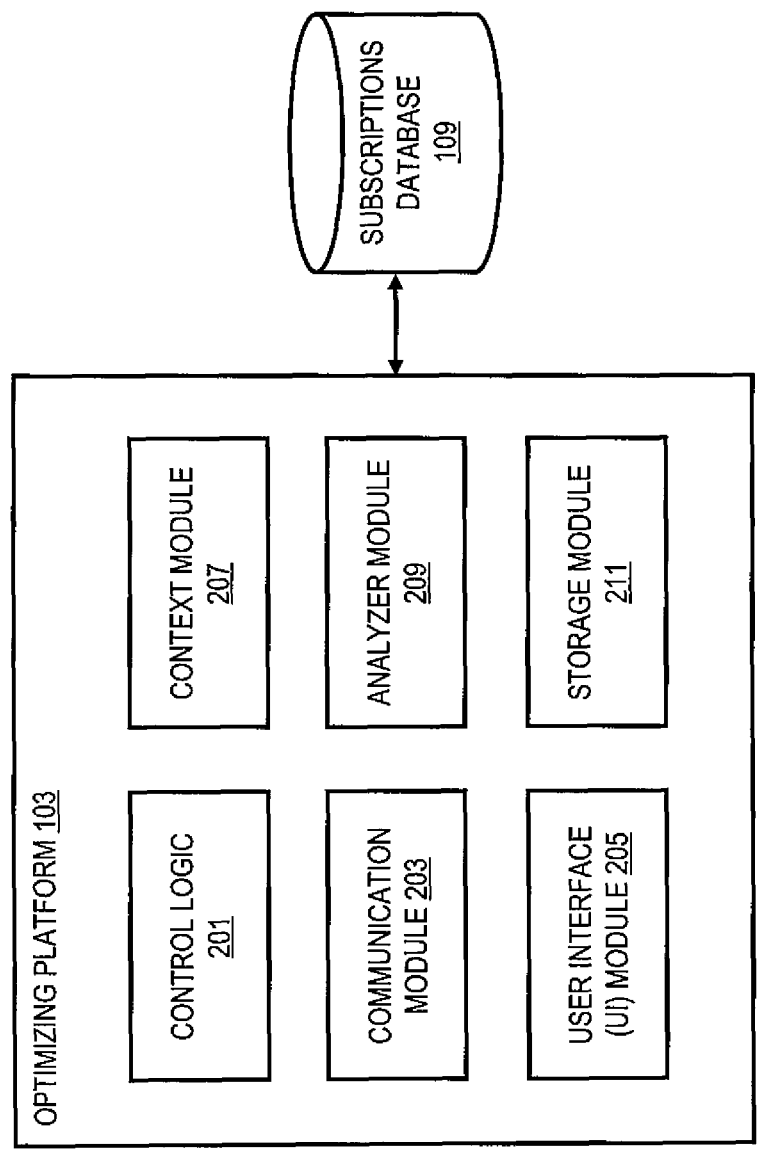
FIG. 2 is a diagram of the components of an optimizing platform, according to one embodiment.

FIG. 2 is a diagram of the components of an optimizing platform 103, according to one embodiment. By way of example, the optimizing platform 103 includes one or more components for optimizing the use of a device based on the subscriptions and contextual information associated with the device. It is contemplated that the functions of these components may be combined in one or more components or performed by other components of equivalent functionality. In this embodiment, the optimizing platform 103 includes a control logic 201, a communication module 203, a user interface (UI) module 205, a context module 207, an analyzer module 209, and a storage module 211.

The control logic 201 oversees tasks, including tasks performed by the communications module 203, the UI module 205, the context module 207, the analyzer module 209, and the storage module 211. For example, although other modules may perform the actual task, the control logic 201 may determine when and how those tasks are performed or otherwise direct the other modules to perform the task. In addition, the control logic 201 may be used to cause, at least in part, an initiation of the one or more activities via the at least one of the one or more subscriptions based, at least in part, on the recommendation.

The communication module 203 is used for communication between the UEs 101, the optimizing platform 103, the applications 107, the subscriptions database 109, the services platform 111, the services 113, the content providers 115, and the satellites 117. The communication module 203 may also be used to communicate commands, requests, data, etc. In addition, the communication module 203 may be used in connection with the user interface module 205 to determine at least one request to perform one or more activities associated with at least one device (e.g., a mobile phone or a tablet). The communication module 203 also may be used to determine an input for specifying the one or more subscriptions, the one or more conditions, the contextual information, the one or more subscription parameters, or a combination thereof. More specifically, the communication module 203 may determine the subscription information (e.g., the one or more conditions) from a user entry, metadata associated with the one or more subscriptions, a cloud resource, the service provider, or a combination thereof. The communication module 203, in connection with the user interface module 205, may also be used to cause, at least in part, a presentation of the recommendation of the at least one of the one or more subscriptions, the one or more conditions, the contextual information, the one or more subscription parameters, or a combination thereof based, at least in part, on user preference information, user configuration information (e.g., a user input), or a combination thereof. The communication module 203, in connection with the analyzer module 209, also may be used to determine a mode of communication (e.g., making a telephone call), a communication endpoint (e.g., a fixed line number or a mobile number), or a combination thereof. Further, the communication module 203 may also be used to cause, at least in part, a presentation of at least one user interface element (e.g., one or more live or dynamic tiles) depicting the one or more conditions, the contextual information, the one or more subscription parameters, or a combination thereof.

As previously discussed, the user interface (UI) module 205 is used in connection with the communication module 203 to determine at least one request to perform one or more activities associated with at least one device. It is contemplated that the user interface module 205 may determine the at least one request by a user entry (e.g., using the screen of a mobile device), one or more voice commands, etc. The user interface module 205 may also be used in connection with communication module 203 to cause, at least in part, a presentation of the recommendation of the at least one of the one or more subscriptions, the one or more conditions, the contextual information, the one or more subscription parameters, or a combination thereof. Further, the user interface module 205, in connection with the communication module 203, also may be used to cause, at least in part, a presentation of at least one user interface element depicting the one or more conditions, the contextual information, the one or more subscription parameters, or a combination thereof.

The context module 207 is used to determine contextual information associated with the at least one device. More specifically, the context module 207 may determine a time (e.g., a.m. or p.m., weekday or weekend, etc.), a location (e.g., a home location, a roaming status, etc.), carrier alternatives, a potential communication endpoint (e.g., a fixed line number or a mobile number), etc., associated with the at least one device, the one or more activities, or a combination thereof.

The analyzer module 209 is used to process and/or facilitate a processing of the at least one request against the one or more conditions of the one or more subscriptions associated with the at least one device to cause, at least in part, a recommendation of at least one of the one or more subscriptions for performing the one or more activities. In particular, the analyzer module 209 can determine the best time for performing the one or more activities or a non-optimal use of the one or more subscriptions. Further, in one example use case, the analyzer module 209 may be used to determine one or more cost optimized timeslots for transmitting one or more delayed text messages. Similarly, the analyzer module 209 also may be used to determine one or more recommended times, one or more recommended quality of service levels, or a combination thereof for performing the one or more activities based, at least in part, on the one or more conditions, the contextual information, the one or more subscription parameters, or a combination thereof. By way of example, the analyzer module 209 may determine that at the current time, MMS are free to send and that the particular user has "x" number remaining MMS per the subscription period. Accordingly, the analyzer module 209 may cause the communication module 203 to cause, at least in part, a presentation of a recommendation to the user (e.g., "send free MMS now"). The analyzer module 209 may also be used to determine account status information associated with the one or more subscriptions. By way of example, the account status may include information as to whether a particular subscription is on hold or is in a suspended state, which may allow certain activities (e.g., home location calls) to proceed, but prohibit other terminal capabilities until the status of the account of has been resolved. Further, as previously discussed, the analyzer module 209, in connection with the communication module 203, also may be used to determine a mode of communication (e.g., a telephone call), a communication endpoint (e.g., a fixed line number or a mobile number), or a combination thereof based, at least in part, on the recommendation of the at least one of the one or more subscriptions.

The storage module 211 is used in connection with the communication module 203 to manage the one or more subscriptions (e.g., service contracts with a communication carrier), the one or more conditions (e.g., rules), and/or the one or more subscription parameters (e.g., details) associated with the at least one device (e.g., a mobile phone or a tablet), the one or more SIM cards, or a combination thereof contained in the subscriptions database 109. In addition, the storage module 211 may be used to manage the status information and/or user preference information, user configuration information, or a combination thereof associated with the at least one device, the one or more SIM cards, or a combination thereof contained in the subscriptions database 109.

Figure 3:
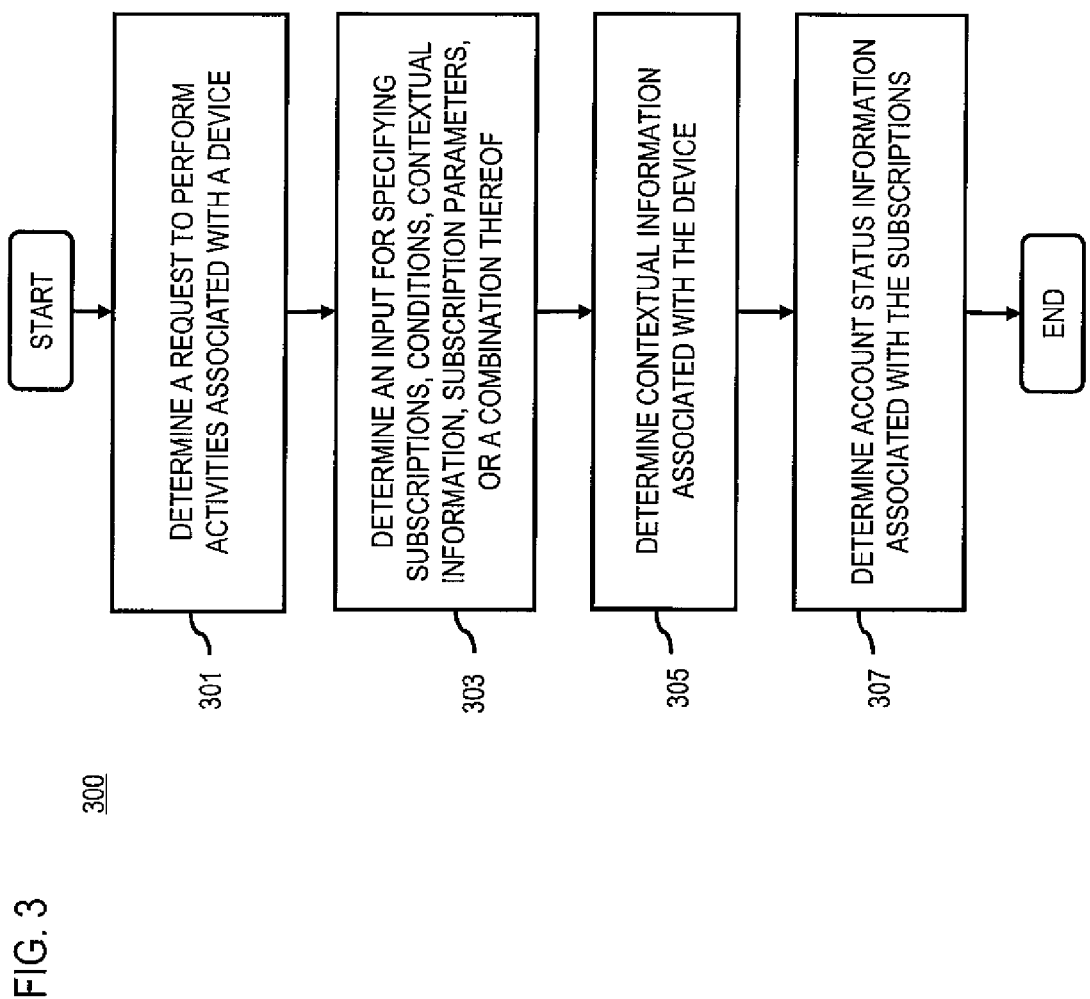
Figure 7:
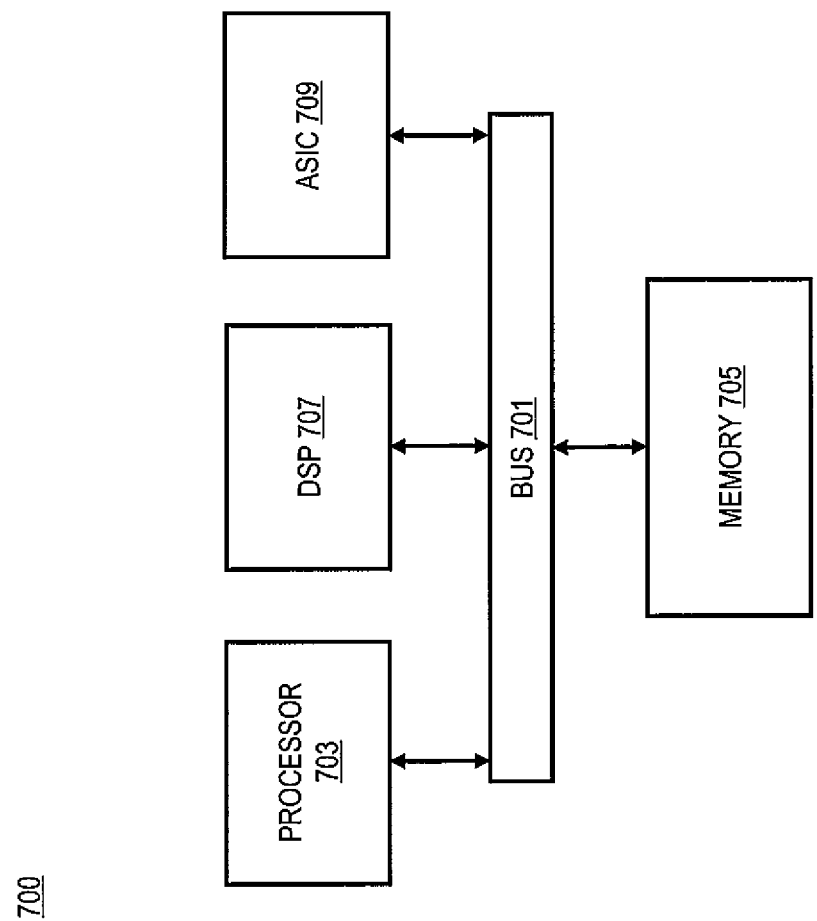
FIG. 7 is a diagram of a chip set that can be used to implement an embodiment of the invention.

FIGS. 3 and 4 are flowcharts of processes for optimizing the use of a device based on the subscriptions and contextual information associated with the device, according to one embodiment. FIG. 3 depicts a process 300 of determining subscription and context information associated with at least one device. In one embodiment, the optimizing platform 103 performs the process 300 and is implemented in, for instance, a chip set including a processor and a memory as shown in FIG. 7. In step 301, the optimizing platform 103 determines at least one request to perform one or more activities associated with at least one device. As previously discussed, the one or more activities may include making and receiving telephone and/or video calls, sending and receiving text messages (e.g., via SMS, MMS, etc.), browsing the Internet, transmitting and receiving data (e.g., mapping and/or navigation information, media, social networking updates, etc.), etc.

In step 303, the optimizing platform 103 determines an input for specifying the one or more subscriptions, the one or more conditions, the contextual information, the one or more subscription parameters, or a combination thereof. By way of example, the optimizing platform 103 can determine the subscription information (e.g., the one or conditions) from a user entry, metadata associated with the one or more subscriptions, a cloud resource, the service provider, or a combination thereof. In one embodiment, the one or more subscriptions are associated with one or more communication carriers. In addition, the one or more conditions may include, at least in part, the when, where, and under what conditions (i.e., the rules or logic) the one or more activities associated with the at least one device will incur a cost and/or consume minutes, text, and/or data associated with the one or more subscriptions. More specifically, the one or more conditions may also indicate the amount of minutes, text, and/or data available at one rate (e.g., a daytime rate) and the amount of minutes, text, and/or data available at another rate (e.g., a nighttime and/or weekend rate). Further, the one or more subscription parameters may include, at least in part, the amount of minutes, text, and/or data remaining during a particular term of the one or more subscriptions (e.g., the amount of minutes remaining for that month).

In step 305, the optimizing platform 103 determines contextual information associated with the at least one device, wherein the recommendation of the at least one of the one or more subscriptions is based, at least in part, on the contextual information. By way of example, the contextual information associated with the at least one device (e.g., a mobile phone or a tablet) may include a time (e.g., a.m. or p.m., weekday or weekend, etc.), a location (e.g., a home location, a roaming status, etc.), available carrier alternatives, a potential communication endpoint (e.g., a fixed line number or a mobile phone number), etc.

In step 307, the optimizing platform 103 determines account status information associated with the one or more subscriptions, wherein the recommendation of the at least one of the one or more subscriptions is based, at least in part, on the account status information. In one embodiment, the account status may include information as to whether a particular subscription is on hold or is in a suspended state, which may allow certain activities (e.g., home location calls) to proceed, but prohibit other terminal capabilities until the status of the account has been resolved. In addition, the account status information may also include the one or more types of subscriptions associated with the at least one device (e.g., individual, prepaid, data only, etc.).

FIG. 4 depicts a process 400 of recommending at least one or the one or more subscriptions for performing the one or more activities associated with the at least one device. In one embodiment, the optimizing platform 103 performs the process 400 and is implemented in, for instance, a chip set including a processor and a memory as shown in FIG. 7. In step 401, the optimizing platform 103 processes and/or facilitates a processing of the at least one request against one or more conditions of one or more subscriptions associated with the at least one device to cause, at least in part, a recommendation of at least one of the one or more subscriptions for performing the one or more activities. As previously discussed, in one embodiment, the one or more conditions consist of the rules or logic associated with the one or more subscriptions and the one or more subscriptions are associated with one or more communication carriers (e.g., AT&T, Verizon, Sprint, etc.). In addition, in one example use case, a recommendation from the optimizing platform 103 may inform a user of the best time for performing the one or more activities or alert the user of a non-optimal use of the one or more subscriptions (e.g., attempting to download an entire music album before 7 p.m.). Further, in one embodiment, the recommendation may consist of one or more automated functions (e.g., delaying the transmission of one or more text messages until a cost optimized timeslot becomes available).

In step 403, the optimizing platform 103 causes, at least in part, a presentation of the recommendation of the at least one of the one or more subscriptions, the one or more conditions, the contextual information, the one or more subscription parameters, or a combination thereof based, at least in part, on user preference information, user configuration information, or a combination thereof. By way of example, the optimizing platform 103 may alert a user to "send free MMS now, you have 121 MMS left for free to send at this hour" or "your roaming data is free now, this is a good time to load your maps." As previously discussed, the user preference information, user configuration information (e.g., user input), or a combination thereof may include one or more standard settings that the user can easily modify to fit his or her lifestyle. By way of example, in the beginning of the month, when the user has the most minutes, text, and/or data available, the user may want the optimizing platform 103 to generate recommendations less frequently than at the end of the month when the user presumably has the least amount of minutes, text, and/or data available. Moreover, the user may want to control the type of notifications caused by the optimizing platform 103 based on his or her general use of the at least one device. For example, if the user mainly carries the device (e.g., a mobile phone) in his or her pocket, then the user can set the optimizing platform 103 to vibrate the device when the optimizing platform 103 generates a cost and/or data saving recommendation. In contrast, if the user mainly carries his or her device in a bag or pocketbook, then the user can set the optimizing platform 103 to audibly notify the user through the device when the optimizing platform 103 generates a cost and/or data saving recommendation.

In step 405, the optimizing platform 103 determines one or recommended times, one or more recommended quality of service levels, or a combination thereof for performing the one or more activities based, at least in part, on the one or more conditions, the contextual information, one or more subscription parameters, or a combination thereof. By way of example, a user riding a bus or train home from work may be browsing one or more applications at an Internet application store (e.g., Nokia Store) or one or more cooking recipes on a cooking website. If the user attempts to download an application or a recipe while riding the bus or the train, the optimizing platform 103 may inform the user that he or she could save cost and/or time by downloading the one or more applications or the one or more recipes when the user gets home and is able to connect to a Wi-Fi network. In addition, the optimizing platform 103 may determine that at a particular time of day (e.g., 6 p.m.), one or more networks are congested and therefore the optimizing platform 103 may recommend that the user perform the one or more activities (e.g., downloading a music album) at a later time to save cost and/or time.

In step 407, wherein the one or more activities include, at least in part, an establishment of at least one communication session with one or more other devices, the optimizing platform 103 determines a mode of communication, a communication endpoint, or a combination thereof based, at least in part, on the recommendation of the at least one of the one or more subscriptions. In step 409, the optimizing platform 103 causes, at least in part, an initiation of the one or more activities via the at least one of the one or more subscriptions based, at least in part, on the recommendation. By way of example, at the time of making a call, the optimizing platform 103 may notify a user "you could make a free call to this person, if you try his fixed line first." The optimizing platform 103 could then ask the user "whether the optimizing platform should dial the fixed line number now?"

In step 411, the optimizing platform 103 optionally causes, at least in part, a presentation of at least one user interface element depicting the one or more conditions, the contextual information, the one or more subscription parameters, or a combination thereof. In particular, it is contemplated that the presentation of this information on the at least one device (e.g., a mobile phone or a tablet) by the optimizing platform 103 can enable the user to keep tack and/or understand all of the conditions and usage associated with his or her device. In one example use case, the optimizing platform 103 may present the at least one user interface element as one or more live or dynamic tiles running in the background of the home screen of the at least one device. More specifically, the one or more live tiles may inform the user, for example, of the cost and/or the amount of data a particular activity will incur and/or consume at a given time and location. In another example use case, the system 100 may present the at least one user interface element as one or more icons on top of a device (e.g., a mobile phone) to inform the user in substantially real-time of the number of minutes, texts, and/or data remaining for the subscription period.

Figure 5B:
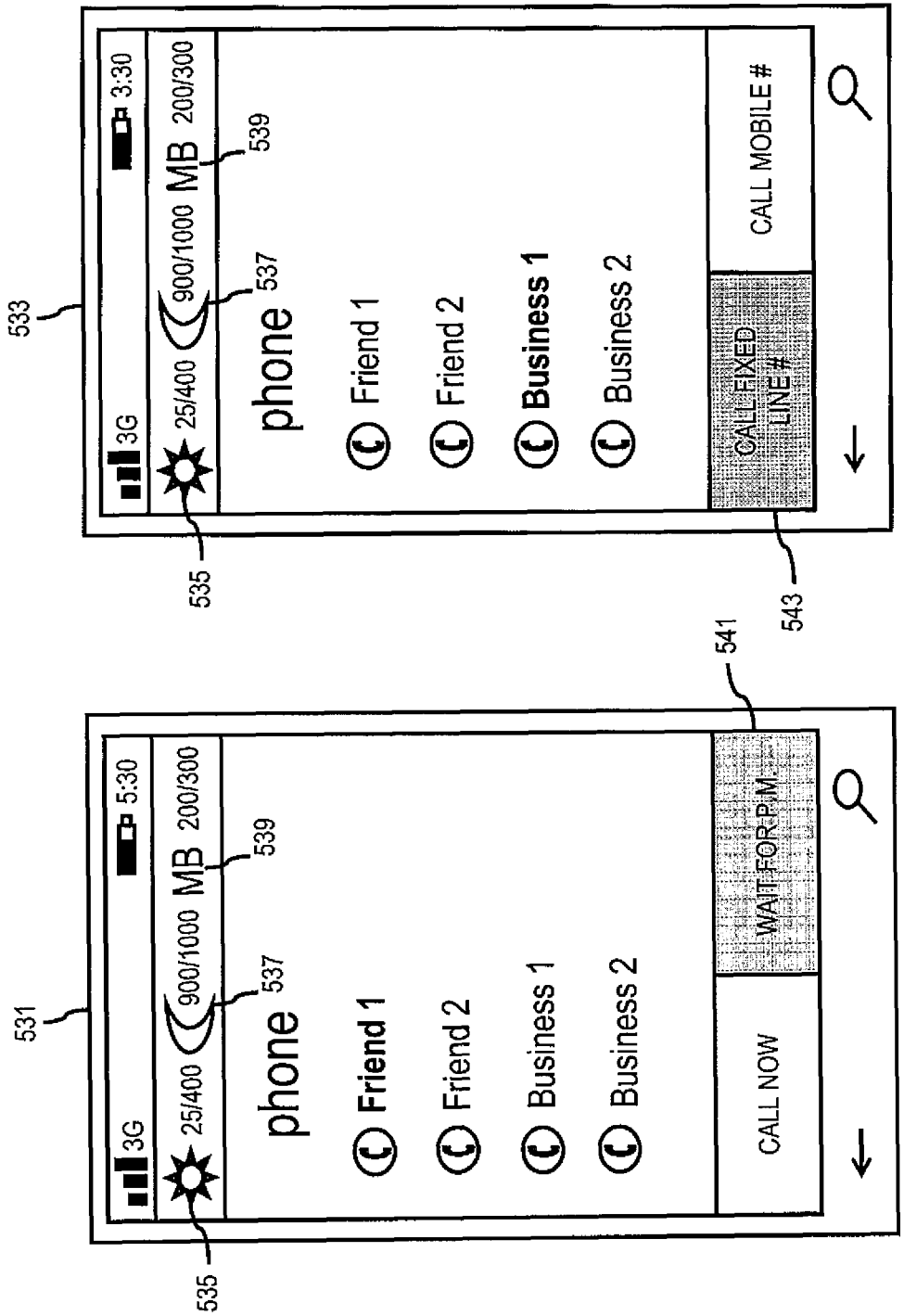

FIGS. 5A and 5B are diagrams of user interfaces utilized in the processes of FIGS. 3 and 4, according to various embodiments. As shown, the example user interfaces of FIGS. 5A and 5B include one or more user interface elements and/or functionalities created and/or modified based, at least in part, on information, data, and/or signals resulting from the processes (e.g., processes 300 and 400) described with respect to FIGS. 3 and 4. More specifically, FIG. 5A illustrates two user interfaces (e.g., interfaces 501 and 503) depicting one or more recommendations of at least one of the one or more subscriptions (e.g., data) for performing the one or more activities (e.g., downloading music).

In one embodiment, the system 100 first determines at least one request to perform one or more activities associated with the interfaces 501 and 503. In this example use case, the activity depicted is browsing and potentially downloading music (e.g., "Album A" and/or "Song B") from an Internet music store. In one or more embodiments, the system 100 next determines an input for specifying one or more subscriptions, one or more conditions, contextual information, one or more subscription parameters, or a combination thereof associated with the interfaces 501 and 503, one or more SIM cards associated with the interfaces 501 and 503, or a combination thereof. In this example use case, the one or more conditions determined by the system 100 from the service provider, for example, include, at least in part, that the data transfer rates for files exceeding 10 megabytes (MB) are $10.00 for the first 10 MB and $1.00 for every 10 MB over the initial 10 MB when using a third generation mobile telecommunication (3G) network. In contrast, the data transfer rate for files exceeding 10 MB is a flat $10.00 when using a Wi-Fi network. Further, the data transfer rate for files less than 10 MB is a flat fee of $1.99 regardless of whether the one or more files are transferred over a 3G network or a Wi-Fi network.

In certain embodiments, the system 100 then determines contextual information associated with the interfaces 501 and 503, wherein a recommendation of at least one of the one or more subscriptions (e.g., data) is based, at least in part, on the contextual information. By way of example, the system 100 can determine a time, a location, available carrier alternatives, a potential communication endpoint, etc. associated with the interfaces 501 and 503. In this example use case, the system 100 determines that the interfaces 501 and 503 are both operating on a 3G network as depicted by the "3G" symbol 505.

In one or more embodiments, once the system 100 determines the subscription details and conditions and the contextual information of the interfaces 501 and 503, the system 100 processes and/or facilitates a processing of the at least one request (e.g., potentially downloading music) against the one or more conditions of the one or more subscriptions associated with the interfaces 501 and 503 to cause, at least in part, a recommendation of at least one of the one or more subscriptions (e.g., data) for performing the one or more activities (e.g., downloading music). As previously discussed, the system 100 may inform a user of the best time for performing the one or more activities or alert the user of a non-optimal use of the one or more subscriptions. Further, it is contemplated that in certain embodiments, the system 100 may cause one or more automated functions (e.g., delay a data transmission until a cost optimized timeslot becomes available).

In one embodiment, the system 100 next causes a presentation of the recommendation of the at least one of the one or more subscriptions, the one or more conditions, the contextual information, the one or more subscription parameters, or a combination thereof based, at least in part, on user preference information, user configuration information (e.g., a user input), or a combination thereof. In this example use case, the system 100 presents the recommendation as highlighted or backlit inputs 507 and 509, respectively. In particular, the system 100 recommends that the user of interface 501 wait until he or she is able to connect the interface 501 to a Wi-Fi network to save on the cost of downloading a 60 MB album. In contrast, the system 100 recommends that the user of interface 503 download the 6 MB song now because the cost of downloading the song is the same on either the 3G network or a Wi-Fi network. In addition, in one or more embodiments, the system 100 may cause, at least in part, a presentation of at least one user interface element depicting the one or more conditions, the contextual information, the one or more subscription parameters, or a combination thereof. More specifically, in this example use case, the system 100 presents the user interface elements as live or dynamic tiles 511 and 513 and 515 and 517 running in the background of the home screen of the interfaces 501 and 503, respectively, to inform the user, for example, of the amount of cost and/or data a particular activity will incur and/or consume at a given time and location. In particular, in this example use case, the live tiles 511 and 515 present to the user of interfaces 501 and 503 the cost of downloading the "Album A" or the "Song B," respectively, and the live or dynamic tiles 513 and 517 present to the user the amount of data that will be consumed by the downloads relative to the amount of data remaining for the period of the subscription.

In another example use case, the system 100 may present the at least one user interface element as one or more icons on top of the at least one device (e.g., a mobile phone) as illustrated by the interfaces 531 and 533 of FIG. 5B. As previously discussed, in one embodiment, the system 100 first determines at least one request to perform one or more activities associated with the interfaces 531 and 533. In this example use case, the activity depicted is making a telephone call to a friend and to a business, respectively. In this example use case, the one or more conditions determined by the system 100 from the service provider, for example, include that during each period of the one or more subscriptions (e.g., a month) the user may use 400 daytime minutes (e.g., before 7 p.m.), 1000 nighttime and/or weekend minutes (e.g., after 7 p.m.), and 300 MB of data. In addition, it is more expensive to make mobile to mobile calls than it is to make mobile to fixed line calls. In one or more embodiments, the system 100 next determines contextual information associated with the interfaces 531 and 533, wherein the recommendation of at least one of the one or more subscriptions (e.g., making a call) is based, at least in part, on the contextual information. In this example use case, the system 100 determines that the user of interface 531 is attempting to call a friend at 5:30 p.m. and the user of interface 533 is attempting to call a business at 3:30 p.m.

In one or more embodiments, once the system 100 determines the subscription details and conditions and the contextual information of the interfaces 531 and 533, the system 100 processes and/or facilitates a processing of the at least one request (e.g., make a telephone call to a friend or to a business, respectively) against the one or more conditions of the one or more subscriptions (e.g., telephone calls) associated with the interfaces 531 and 533, one or more SIM cards associated with the interfaces 531 and 533, or a combination thereof. More specifically, the system 100 can determine one or more recommended times, one or more recommended quality of service levels, or a combination thereof for performing the one or more activities based, at least in part, on the one or more conditions, the contextual information, the one or more subscription parameters, or a combination thereof. In one embodiment, the system 100 then causes a presentation of the recommendation of the at least one or more subscriptions, the one or more conditions, the contextual information, the one or more subscription parameters, or a combination thereof based, at least in part, on user preference information, user configuration information, or a combination thereof. By way of example, the one or more icons 535, 537, and 539 on top of the interfaces 531 and 533 depict 25 of 400 daytime minutes, 900 of 1000 nighttime minutes, and 200 of 300 MB of data, respectively. Further, in this example use case, the system 100 presents the recommendations as highlighted or backlit inputs 541 and 5543, respectively. In particular, the system 100 recommends that the user of interface 531 wait until after 7 p.m. since he or she only has 25 daytime minutes remaining for the subscription period and he or she is only trying to call a friend. In contrast, the system 100 recommends that the user of interface 533 call the fixed line number of the business because calling a fixed line is less expensive.

The processes described herein for optimizing the use of a device based on the subscriptions and contextual information associated with the device may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 6:
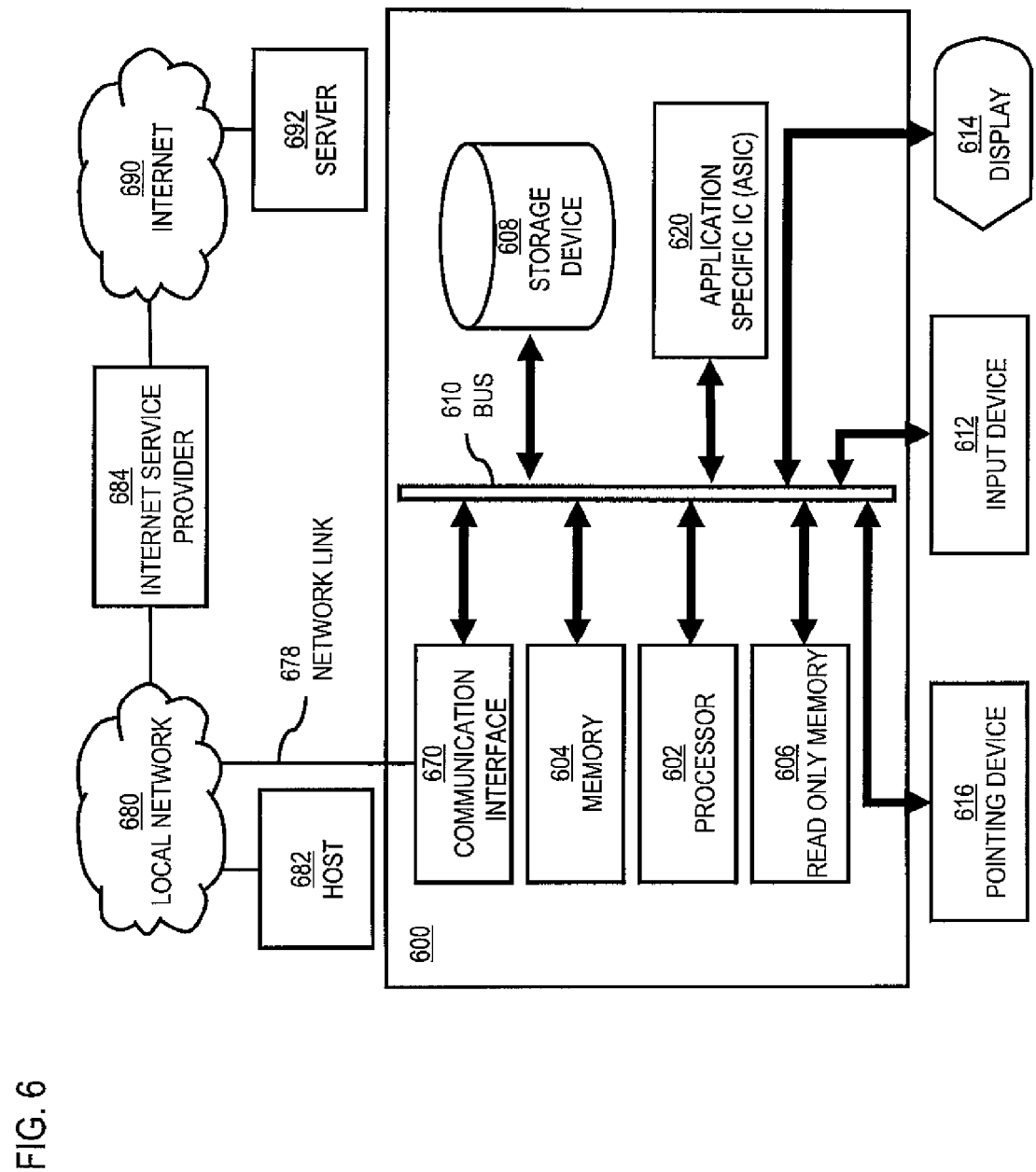
FIG. 6 is a diagram of hardware that can be used to implement an embodiment of the invention.

FIG. 6 illustrates a computer system 600 upon which an embodiment of the invention may be implemented. Although computer system 600 is depicted with respect to a particular device or equipment, it is contemplated that other devices or equipment (e.g., network elements, servers, etc.) within FIG. 6 can deploy the illustrated hardware and components of system 600. Computer system 600 is programmed (e.g., via computer program code or instructions) to optimize the use of a device based on the subscriptions and contextual information associated with the device as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 600, or a portion thereof, constitutes a means for performing one or more steps of optimizing the use of a device based on the subscriptions and contextual information associated with the device.

A bus 610 includes one or more parallel conductors of information so that information is transferred quickly among devices coupled to the bus 610. One or more processors 602 for processing information are coupled with the bus 610.

A processor (or multiple processors) 602 performs a set of operations on information as specified by computer program code related to optimize the use of a device based on the subscriptions and contextual information associated with the device. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random access memory (RAM) or any other dynamic storage device, stores information including processor instructions for optimizing the use of a device based on the subscriptions and contextual information associated with the device. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or any other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for optimizing the use of a device based on the subscriptions and contextual information associated with the device, is provided to the bus 610 for use by the processor from an external input device 612, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT), a liquid crystal display (LCD), a light emitting diode (LED) display, an organic LED (OLED) display, a plasma screen, or a printer for presenting text or images, and a pointing device 616, such as a mouse, a trackball, cursor direction keys, or a motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of ASICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals, that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to the communication network 105 for optimizing the use of a device based on the subscriptions and contextual information associated with the device to the UEs 101.

The term "computer-readable medium" as used herein refers to any medium that participates in providing information to processor 602, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 608. Volatile media include, for example, dynamic memory 604. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 620.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690.

A computer called a server host 692 connected to the Internet hosts a process that provides a service in response to information received over the Internet. For example, server host 692 hosts a process that provides information representing video data for presentation at display 614. It is contemplated that the components of system 600 can be deployed in various configurations within other computer systems, e.g., host 682 and server 692.

At least some embodiments of the invention are related to the use of computer system 600 for implementing some or all of the techniques described herein. According to one embodiment of the invention, those techniques are performed by computer system 600 in response to processor 602 executing one or more sequences of one or more processor instructions contained in memory 604. Such instructions, also called computer instructions, software and program code, may be read into memory 604 from another computer-readable medium such as storage device 608 or network link 678. Execution of the sequences of instructions contained in memory 604 causes processor 602 to perform one or more of the method steps described herein. In alternative embodiments, hardware, such as ASIC 620, may be used in place of or in combination with software to implement the invention. Thus, embodiments of the invention are not limited to any specific combination of hardware and software, unless otherwise explicitly stated herein.

The signals transmitted over network link 678 and other networks through communications interface 670, carry information to and from computer system 600. Computer system 600 can send and receive information, including program code, through the networks 680, 690 among others, through network link 678 and communications interface 670. In an example using the Internet 690, a server host 692 transmits program code for a particular application, requested by a message sent from computer 600, through Internet 690, ISP equipment 684, local network 680 and communications interface 670. The received code may be executed by processor 602 as it is received, or may be stored in memory 604 or in storage device 608 or any other non-volatile storage for later execution, or both. In this manner, computer system 600 may obtain application program code in the form of signals on a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red carrier wave serving as the network link 678. An infrared detector serving as communications interface 670 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602.

FIG. 7 illustrates a chip set or chip 700 upon which an embodiment of the invention may be implemented. Chip set 700 is programmed to optimize the use of a device based on the subscriptions and contextual information associated with the device as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of providing user interface navigation information associated with the availability of functions. Chip set or chip 700, or a portion thereof, constitutes a means for performing one or more steps of optimizing the use of a device based on the subscriptions and contextual information associated with the device.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 700 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to optimize the use of a device based on the subscriptions and contextual information associated with the device. The memory 705 also stores the data associated with or generated by the execution of the inventive steps.

Figure 8:
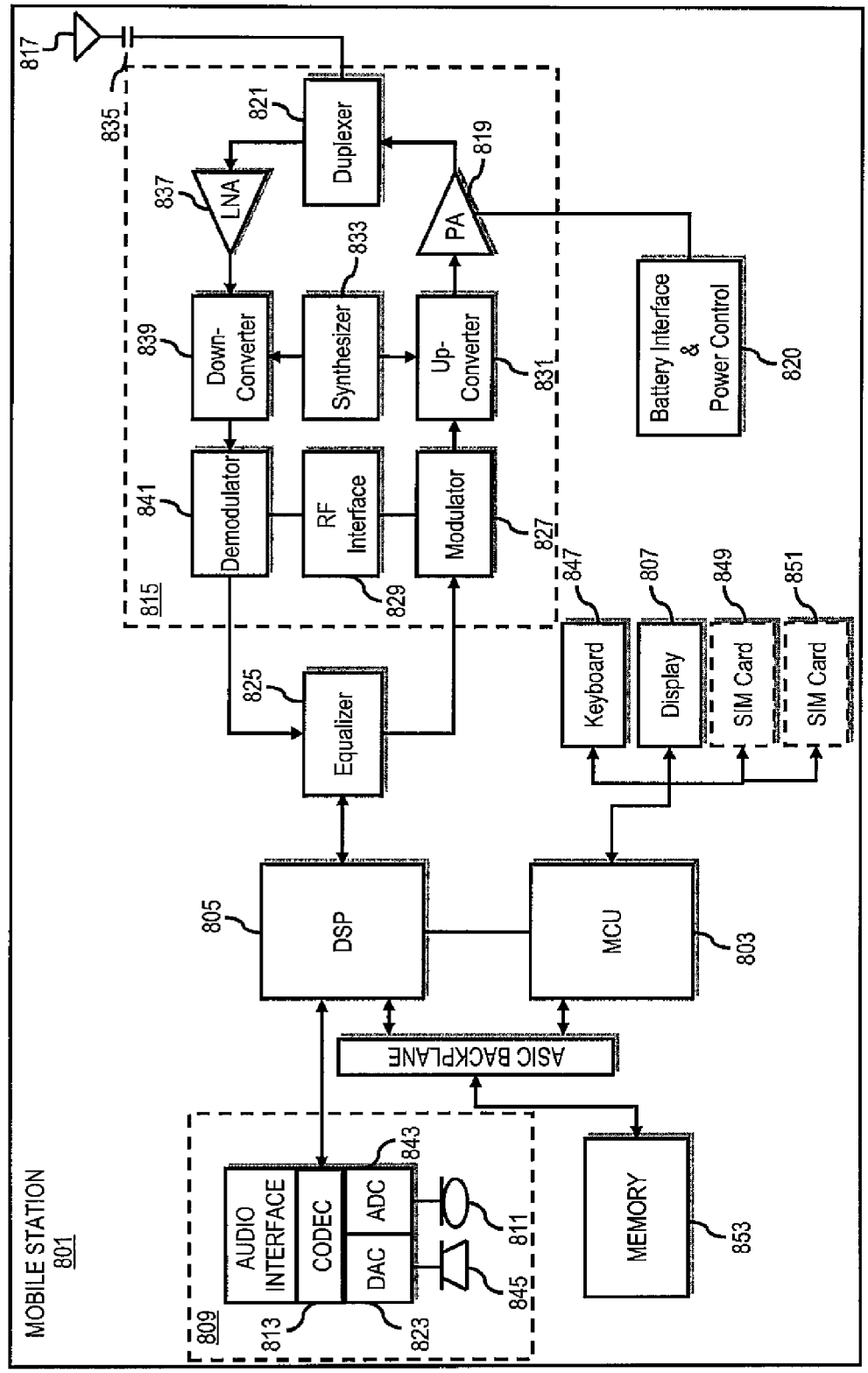
FIG. 8 is a diagram of a mobile terminal (e.g., handset) that can be used to implement an embodiment of the invention.

FIG. 8 is a diagram of exemplary components of a mobile terminal (e.g., handset) for communications, which is capable of operating in the system of FIG. 1, according to one embodiment. In some embodiments, mobile terminal 801, or a portion thereof, constitutes a means for performing one or more steps of optimizing the use of a device based on the subscriptions and contextual information associated with the device. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile terminal functions that perform or support the steps of optimizing the use of a device based on the subscriptions and contextual information associated with the device. The display 807 includes display circuitry configured to display at least a portion of a user interface of the mobile terminal (e.g., mobile telephone). Additionally, the display 807 and display circuitry are configured to facilitate user control of at least some functions of the mobile terminal. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile terminal 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (Wi-Fi), satellite, and the like, or any combination thereof.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803 which can be implemented as a Central Processing Unit (CPU).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile terminal 801 to optimize the use of a device based on the subscriptions and contextual information associated with the device. The MCU 803 also delivers a display command and a switch command to the display 807 and to the speech output switching controller, respectively. Further, the MCU 803 exchanges information with the DSP 805 and can access one or more optionally incorporated SIM cards 849 and 851 and a memory 853. In addition, the MCU 803 executes various control functions required of the terminal. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile terminal 801.

The CODEC 813 includes the ADC 823 and DAC 843. The memory 853 stores various data including call incoming tone data and is capable of storing other data including music data received via, e.g., the global Internet. The software module could reside in RAM memory, flash memory, registers, or any other form of writable storage medium known in the art. The memory device 853 may be, but not limited to, a single memory, CD, DVD, ROM, RAM, EEPROM, optical storage, magnetic disk storage, flash memory storage, or any other non-volatile storage medium capable of storing digital data.

The one or more optionally incorporated SIM cards 849 and 851 carry, for instance, important information, such as the cellular phone number, the carrier supplying service, subscription details, and security information. The SEM cards 849 and 851 serve primarily to identify the mobile terminal 801 on a radio network. The cards 849 and 851 also contain a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   determining, by a processor of a user device, at least one request to perform one or more activities, wherein the one or more activities are to be performed using one or more subscriptions associated with the user device;
   determining, by the processor, one or more recommendation frequencies based, at least in part, on a billing cycle of the one or more subscriptions; and
   processing, by the processor, the at least one request against one or more conditions of the one or more subscriptions associated with the user device, and initiating a presentation on a user interface of the user device of a recommendation of at least one of the one or more subscriptions for performing the one or more activities based on the one or more recommendation frequencies.

2. A method of claim 1, further comprising:
   determining contextual information associated with the user device,
   wherein the recommendation of the at least one of the one or more subscriptions is based, at least in part, on the contextual information.

3. A method of claim 2, further comprising:
   determining one or more recommended times, one or more recommended quality of service levels, or a combination thereof for performing the one or more activities based, at least in part, on the one or more conditions, the contextual information, one or more subscription parameters, or a combination thereof.

4. A method of claim 3, further comprising:
   initiating a presentation of at least one user interface element depicting the one or more conditions, the contextual information, the one or more subscription parameters, or a combination thereof.

5. A method of claim 3, further comprising:
   determining an input for specifying the one or more subscriptions, the one or more conditions, the contextual information, the one or more subscription parameters, or a combination thereof.

6. A method of claim 1, further comprising:
   initiating the one or more activities via the at least one of the one or more subscriptions based, at least in part, on the recommendation.

7. A method of claim 3, further comprising:
   initiating a presentation of the recommendation of the at least one of the one or more subscriptions, the one or more conditions, the contextual information, the one or more subscription parameters, or a combination thereof based, at least in part, on user preference information, user configuration information, or a combination thereof.

8. A method of claim 1, further comprising:
   determining account status information with respect to the one or more subscriptions; and
   initiating a presentation of at least one graphic icons depicting the account status information on the user interface, wherein the at least one graphic icons includes a day time minute icon, a night time minute icon, a data amount icon, or a combination thereof,
   wherein the recommendation of the at least one of the one or more subscriptions is based, at least in part, on the account status information.

9. A method of claim 1, wherein the one or more activities include, at least in part, an establishment of at least one communication session with one or more other devices, the method further comprising:
   determining a mode of communication, a communication endpoint, or a combination thereof based, at least in part, on the recommendation of the at least one of the one or more subscriptions.

10. A method of claim 1, wherein the one or more recommendation frequencies include a first recommendation frequency associated with a first time period during the billing cycle, and a second recommendation frequency associated with a second time period during the billing cycle, wherein the first time period is earlier than the second time period and the first recommendation frequency is lower than the second recommendation frequency.

11. An apparatus comprising:

at least one processor; and at least one memory including computer program code for one or more programs, the at least one memory and the computer program code configured to, with the at least one processor, cause the apparatus embedded in a user device to perform at least the following, determine at least one request to perform one or more activities, wherein the one or more activities are to be performed using one or more subscriptions associated with the user device;

determine one or more recommendation frequencies based, at least in part, on a billing cycle of the one or more subscriptions; and process the at least one request against one or more conditions of the one or more subscriptions associated with the user device, and initiating a presentation on a user interface of the user device of a recommendation of at least one of the one or more subscriptions for performing the one or more activities based on the one or more recommendation frequencies.

12. An apparatus of claim 11, wherein the apparatus is further caused to:

determine contextual information associated with the user device, wherein the recommendation of the at least one of the one or more subscriptions is based, at least in part, on the contextual information.

13. An apparatus of claim 12, wherein the apparatus is further caused to:

determine one or more recommended times, one or more recommended quality of service levels, or a combination thereof for performing the one or more activities based, at least in part, on the one or more conditions, the contextual information, one or more subscription parameters, or a combination thereof.

14. An apparatus of claim 13, wherein the apparatus is further caused to:

initiate a presentation of at least one user interface element depicting the one or more conditions, the contextual information, the one or more subscription parameters, or a combination thereof.

15. An apparatus of claim 13, wherein the apparatus is further caused to:

determine an input for specifying the one or more subscriptions, the one or more conditions, the contextual information, the one or more subscription parameters, or a combination thereof.

16. An apparatus of claim 11, wherein the apparatus is further caused to:

initiate the one or more activities via the at least one of the one or more subscriptions based, at least in part, on the recommendation.

17. An apparatus of claim 13, wherein the apparatus is further caused to:

initiate a presentation of the recommendation of the at least one of the one or more subscriptions, the one or more conditions, the contextual information, the one or more subscription parameters, or a combination thereof based, at least in part, on user preference information, user configuration information, or a combination thereof.

18. An apparatus of claim 11, wherein the apparatus is further caused to:

determine account status information associated with the one or more subscriptions, wherein the recommendation of the at least one of the one or more subscriptions is based, at least in part, on the account status information.

19. A non-transitory computer readable medium including one or more sequences of one or more instructions which, when executed by one or more processors, cause an apparatus embedded in a user device to at least perform the steps:

determining at least one request to perform one or more activities, wherein the one or more activities are to be performed using one or more subscriptions associated with the user device;

determining one or more recommendation frequencies based, at least in part, on a billing cycle of the one or more subscriptions; and processing the at least one request against one or more conditions of the one or more subscriptions associated with the user device, and initiating a presentation on a user interface of the user device of a recommendation of at least one of the one or more subscriptions for performing the one or more activities based on the one or more recommendation frequencies.

20. A non-transitory computer readable medium of claim 19, wherein the apparatus is caused, at least in part, to further perform:

determining contextual information associated with the user device, wherein the recommendation of the at least one of the one or more subscriptions is based, at least in part, on the contextual information.

* * * * *